United States Patent
Hsieh et al.

(10) Patent No.: US 10,061,440 B2
(45) Date of Patent: Aug. 28, 2018

(54) OPTICAL TOUCH SENSING SYSTEM, OPTICAL TOUCH SENSING DEVICE AND TOUCH DETECTION METHOD THEREOF

(71) Applicant: Wistron Corporation, New Taipei (TW)

(72) Inventors: Chia-Ta Hsieh, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 134 days.

(21) Appl. No.: 15/084,472

(22) Filed: Mar. 29, 2016

(65) Prior Publication Data

US 2017/0212639 A1 Jul. 27, 2017

(30) Foreign Application Priority Data

Jan. 21, 2016 (TW) .............................. 105101928 A

(51) Int. Cl.
*G06F 3/042* (2006.01)
*G06F 3/0354* (2013.01)

(52) U.S. Cl.
CPC ........ *G06F 3/0421* (2013.01); *G06F 3/03545* (2013.01)

(58) Field of Classification Search
CPC ............... G06F 3/0421; G06F 3/03545; G06F 3/03542; G06F 2203/04104
See application file for complete search history.

(56) References Cited

U.S. PATENT DOCUMENTS

| 2011/0043492 | A1  | 2/2011  | Elsasser et al. |
| 2011/0169775 | A1* | 7/2011  | Liaw .................... G06F 3/03545 345/175 |
| 2013/0106802 | A1  | 5/2013  | Liaw et al. |
| 2015/0338996 | A1* | 11/2015 | Hsieh .................... G06F 3/0421 345/175 |
| 2017/0322672 | A1* | 11/2017 | Kitani .................... G06F 3/0418 |

FOREIGN PATENT DOCUMENTS

| TW | 201108048 | 3/2011 |
| TW | 201131434 | 9/2011 |

OTHER PUBLICATIONS

"Office Action of Taiwan Counterpart Application" with partial English translation, dated Aug. 29, 2016, p. 1-p. 27.

* cited by examiner

*Primary Examiner* — Adam R Giesy
(74) *Attorney, Agent, or Firm* — JCIPRNET

(57) ABSTRACT

An optical touch sensing system, an optical touch sensing device, and a touch detection method thereof are provided. The optical touch sensing system includes an optical touch sensing device and a stylus. The optical touch sensing device includes a touch panel, multiple optical sensors, a first light source, and a processor. The touch panel has a touch surface. The first light source generates a first light periodically. The stylus includes a switch module and a second light source. The switch module enables the second light source to generate a second light when the stylus touches the touch surface. The processor determines a position touched by the stylus according to the first light and the second light received by the optical sensors.

22 Claims, 4 Drawing Sheets

OPTICAL TOUCH SENSING SYSTEM, OPTICAL TOUCH SENSING DEVICE AND TOUCH DETECTION METHOD THEREOF

CROSS-REFERENCE TO RELATED APPLICATION

This application claims the priority benefit of Taiwan application serial no. 105101928, filed on Jan. 21, 2016. The entirety of the above-mentioned patent application is hereby incorporated by reference herein and made a part of this specification.

BACKGROUND OF THE INVENTION

Field of the Invention

The invention relates to optical touch sensing technology and particularly relates to an optical touch sensing system, an optical touch sensing device, and a touch detection method thereof.

Description of Related Art

Touch screen technology has been extensively used on various consumer electronic devices, which allows the user to select and control items on the screen by touching the screen intuitively. Among the conventional touch sensing technologies, the capacitive touch screen provides the best touch sensing effect but it is also the most expensive. Other than that, an optical touch screen that utilizes optical lenses to detect the touched position has advantages, such as low cost and high accuracy, and thus has become another option for large-sized touch screens.

The optical touch screen uses multiple optical lenses that are disposed on the edge of the screen to capture images of the operation of the user's finger on the screen and analyzes the data generated by the touching object (e.g. stylus) that blocks light in the captured images, so as to calculate the exact position of the touched point by triangulation. Even though the optical lenses are disposed as close to the touch screen as possible, a distance inevitably exists between the image capturing plane of the optical lenses and the touch surface. In some cases, such as writing on the touch screen with the touching object (stylus), if the user does not lift the stylus far enough from the touch screen between strokes and causes the distance between the touching object and the touch screen to be insufficient, it may be determined that the stylus is still in contact with the touch screen. Consequently, the strokes may be erroneously connected and the screen may display a wrong image. In view of the above, how to improve the optical touch sensing technology to accurately determine whether the stylus touches the touch screen is an issue that needs to be addressed.

SUMMARY OF THE INVENTION

The invention provides an optical touch sensing system, an optical touch sensing device, and a touch detection method thereof for accurately detecting a timing a stylus touches a touch panel, so as to determine a position touched by the stylus.

The invention discloses an optical touch sensing system. The optical touch sensing system includes an optical touch sensing device and a stylus. The optical touch sensing device includes a touch panel, a plurality of optical sensors, a first light source, and a processor. The touch panel has a touch surface. The first light source generates a first light periodically. The processor is coupled to the optical sensors and the first light source. The stylus includes a switch module and a second light source. The switch module is coupled to the second light source. The switch module enables the second light source to generate a second light when the stylus touches the touch surface. The processor determines a position of the stylus according to the first light and the second light received by the optical sensors.

The invention discloses a touch detection method for an optical touch sensing device. The optical touch sensing device includes a touch surface. The touch detection method includes the following. A first light is generated periodically. Whether an estimated touch position is obtained is determined according to the first light. When the estimated touch position is obtained, whether a second light is received is determined in a next disabling period of a first light source, wherein the second light is generated when a stylus touches the touch surface. If the second light is received in the next disabling period of the first light source, it is determined that the estimated touch position is a position touched by the stylus.

The invention discloses an optical touch sensing device. The optical touch sensing device includes a touch panel, a plurality of optical sensors, a first light source, a light source generating module, a touch position determining module, and a touch determining module. The touch panel has a touch surface. The light source generating module controls the first light source to periodically generate a first light. The touch position determining module determines whether an estimated touch position is obtained according to the first light. The touch determining module is coupled to the touch position determining module. When the estimated touch position is obtained, the touch determining module determines whether a second light is received in a next disabling period of the first light source, wherein the second light is generated when the stylus touches the touch surface. If the second light is received in the next disabling period of the first light source, the touch determining module determines that the estimated touch position is the position touched by the stylus.

The invention discloses an optical touch sensing system, which includes a touch panel and a stylus. An optical touch sensing device includes a touch panel, a plurality of optical sensors, a first light source, and a processor. The touch panel has a touch surface. The first light source generates a first light periodically. The processor is coupled to the optical sensors and the first light source. The stylus includes a switch module and a second light source. When the switch module is pressed, the second light source generates a second light. The processor determines a position of the stylus according to the first light and the second light received by the optical sensors.

The invention discloses a touch detection method for an optical touch sensing device, wherein the optical touch sensing device includes a touch surface. The touch detection method includes the following. A first light is generated periodically. Whether an estimated touch position is obtained is determined according to the first light. When the estimated touch position is obtained, whether a second light is received is determined in a next disabling period of a first light source, wherein the second light is generated when a switch module of a stylus is pressed. If the second light is received in the next disabling period of the first light source, it is determined that the estimated touch position is a position touched by the stylus.

The invention discloses an optical touch sensing device. The optical touch sensing device includes a touch panel, a plurality of optical sensors, a first light source, a light source generating module, a touch position determining module, and a touch determining module. The touch panel has a touch surface. The light source generating module controls the first light source to periodically generate a first light. The touch position determining module determines whether an estimated touch position is obtained according to the first light. The touch determining module is coupled to the touch position determining module. When the estimated touch position is obtained, the touch determining module determines whether a second light is received in a next disabling period of the first light source, wherein the second light is generated when a switch module of a stylus is pressed. If the second light is received in the next disabling period of the first light source, the touch determining module determines that the estimated touch position is the position touched by the stylus.

Based on the above, in the optical touch sensing system, the optical touch sensing device, and the touch detection method thereof described in the embodiments of the invention, whether the estimated touch position is obtained is determined first according to the first light on the optical touch sensing device. After the estimated touch position is obtained, the optical touch sensing device determines whether the stylus touches the touch panel according to the second light emitted from the stylus in the next disabling period of the first light source. The second light may be generated when the stylus touches the touch panel or when the user presses the switch module on the stylus. Accordingly, the optical touch sensing device detects the second light and uses it as the signal to determine whether the stylus touches the touch panel, so as to help determine whether the estimated touch position is actually the position touched by the stylus. In addition, the brightness of the second light may be adjusted to be lower than a threshold value preset by the optical touch sensing device for power saving.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
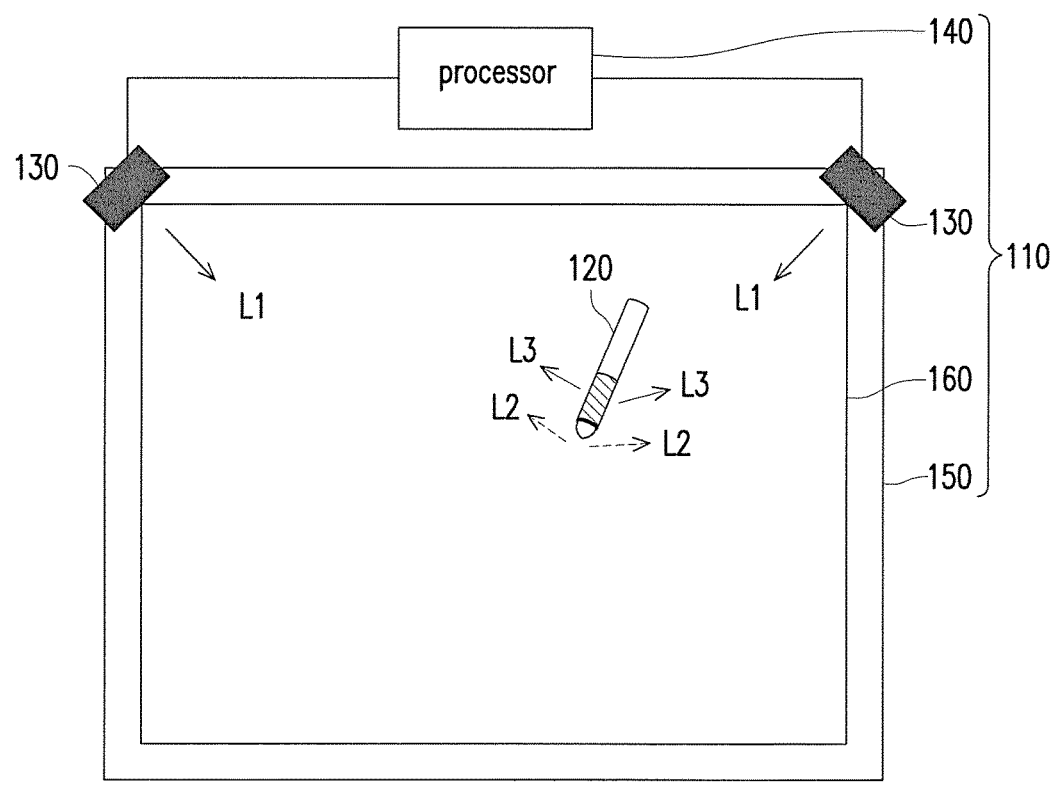
FIG. 1 is a schematic diagram of the optical touch sensing system according to an embodiment of the invention.

FIG. 1 is a schematic diagram of an optical touch sensing system 100 according to an embodiment of the invention. The optical touch sensing system 100 includes an optical touch sensing device 110 and a stylus 120. The optical touch sensing device 110 includes a touch panel 150, at least two ray machine modules 130, and a processor 140. In this embodiment, each ray machine module 130 may include an optical sensor (e.g. an infrared camera) and a first light source. The touch panel 150 has a touch surface 160.

In some embodiments, the first light source may be independent of the ray machine module. The number of the first light sources may be one or more. A third light L3 is obtained by reflecting a first light L1 from the stylus. In this embodiment, the first light source may be a light emitting diode unit that emits an infrared light, and the first light source is controlled by the processor 130 to intermittently or periodically emit the first light (e.g. an infrared light). Those who apply this embodiment may adjust the positions of the ray machine module, the optical sensor, and the first light source as appropriate; for example, separating the optical sensor and the first light source and disposing them at different positions of the optical touch sensing device 110.

The first light source is not limited to an infrared light source and may also be a visible light source, other invisible light sources (e.g. an ultraviolet light), or a laser light source. In this embodiment of the invention, the infrared light source (invisible to naked eyes) is selected as the first light source in order to prevent dazzling the user and reduce the influence of the ambient light, and the first light L1 generated therefrom is an infrared light. An infrared filter may be disposed in front of a lens of the optical sensor in the ray machine module 130, so as to filter out unwanted lights with other wavelengths and to reduce interference of the ambient light. The wavelength of the infrared light is in a range of 760 nm to 1 mm. The processor 140 may be a central processing unit (CPU), a micro-processor, or an application-specific integrated circuit (ASIC). Nevertheless, the embodiment of the invention is not limited thereto.

The processor 140 is coupled to the touch panel 150, the optical sensors in the ray machine modules 130, and the first light source. The optical sensors are driven by the processor 140 to obtain optical images on the touch surface 160 of the touch panel 150 and transmit the optical images back to the processor 140. The processor 140 obtains a position of the stylus 120 on the touch surface 160 based on the optical images by a triangulation method. Although the optical sensors are disposed as close to the touch screen as possible, a distance inevitably exists between image capturing planes of the optical sensors and the touch surface. Therefore, even though the position of the stylus 120 on the touch surface 160 is determined by using the first light source, whether the stylus 120 has touched the touch surface 160 cannot be determined.

Thus, in this embodiment of the invention, the stylus 120 is designed, such that a light signal is generated when a touch end (e.g. a tip of the stylus 120) of the stylus 120 is pressed against the touch surface 160 of the touch panel 150. The light signal is the second light L2 (as indicated by the dotted arrow in FIG. 1) described in this embodiment of the invention. Accordingly, the processor 140 in the optical touch sensing device 110 detects the second light L2 and uses it as the signal to determine whether the stylus 120 touches the touch panel 150, so as to help to determine whether the detected position information is actually the position on the touch surface 160 touched by the stylus 120.

Figure 2:
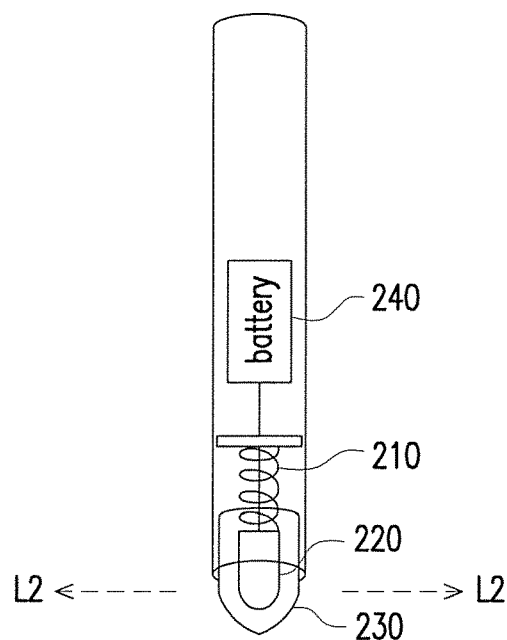
FIG. 2 and FIG. 3 are structure diagrams of the stylus according to an embodiment of the invention.
Figure 3:
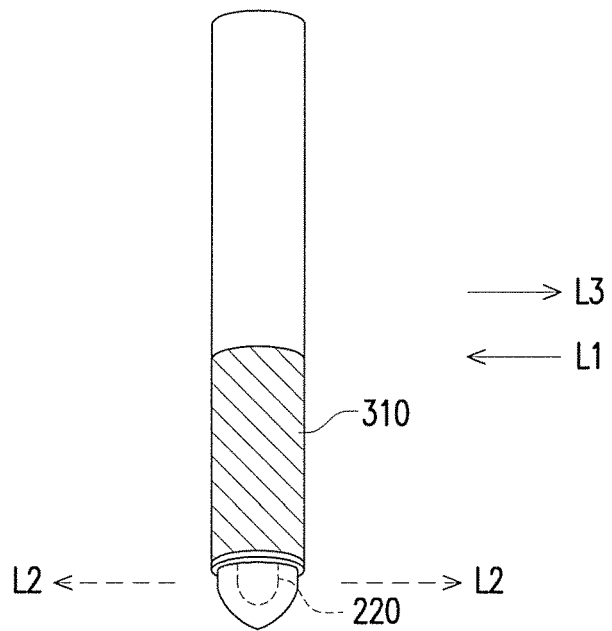

FIG. 2 and FIG. 3 are structure diagrams of the stylus 120 according to an embodiment of the invention. FIG. 2 shows an internal structure of the stylus 120 and FIG. 3 shows an external structure of the stylus 120. Referring to FIG. 2 and FIG. 3, the stylus 120 mainly includes a switch module 210 and a second light source 220 and further includes a touch end 230, a power storage device 240, and a reflection area 310. The switch module 210 is coupled to the second light source 220. In this embodiment, the switch module 210 is a pressure switch composed of a spring, and the second light source 220 may be a light emitting diode unit that emits the second light L2 (e.g. an infrared light). The second light source 220 is mainly disposed at the touch end 230 of the stylus 120. The touch end 230 may be a tip portion of the stylus 120, which is mainly used for contacting the touch surface 160. The touch end 230 is an object of a transparent material, which covers the second light source 220 implemented by using an infrared light emitting diode unit. When the user holds the stylus 120 and causes the touch end 230 to be pressed, the switch module 210 connects with the power storage device 240 and the second light source 220, such that the second light source 220 generates the second light L2. However, if the user holds the stylus 120 and does not cause the touch end 230 to be pressed, the stylus 120 does not generate the second light L2. In other words, the switch module 210 determines whether the stylus 120 touches the touch panel 150, so as to enable the second light source 220 to generate the second light L2. The power storage device 240 may be a battery for power supply.

In FIG. 3, the reflection area 310 is disposed in a pen body portion of the stylus 120 to reflect the first light L1 generated by the first light source in FIG. 1 into the third light L3 for the optical touch sensing device 110 in FIG. 1 to more accurately determine the position of the stylus 120.

In this embodiment, the first light L1 and the second light L2 may have the same wavelength, e.g. both infrared lights. The first light source and the second light source 220 may both be implemented by using light emitting diode units that emit an infrared light.

It should be noted that the processor 140 determines whether an estimated touch position is obtained according to the first light L1 received by the optical sensor in the ray machine module 130. In order that the processor 140 of the optical touch sensing device 110 in FIG. 1 is able to distinguish the third light L3 (obtained through the optical sensor in the ray machine module 130 by reflecting the first light L1 from the stylus 120) and the second light L2 (generated when the touch end 230 of the stylus 120 is pressed) from each other, the processor 140 in the embodiment of the invention determines whether the optical sensor in the ray machine module 130 receives the second light L2 in a next disabling period of the first light L1 periodically generated by the first light source, so as to determine whether the estimated touch position obtained in a previous enabling period of the first light L1 is actually the position where the touch surface 160 is touched by the stylus 120.

In another embodiment in line with the spirit of the invention, the switch module of the stylus 120 in FIG. 1 may be a press switch, instead of the pressure switch as shown in FIG. 2 and FIG. 3. When the user thinks that the touch end of the stylus 120 has touched the touch surface 160 of the touch panel 150 in FIG. 1, the user may press the press switch to enable the second light source to generate the second light. Accordingly, the processor 140 in FIG. 1 determines that the estimated touch position obtained according to the first light L1 at the moment is indeed the position touched by the stylus 120.

Figure 4:
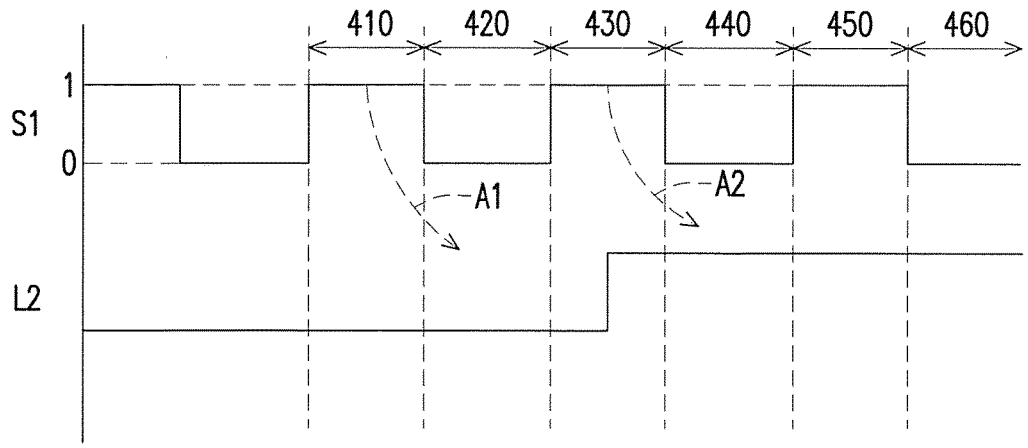
FIG. 4 is a waveform diagram of the PWM signal S1 for periodically generating the first light L1 and the second light L2 according to an embodiment of the invention.

FIG. 4 is a waveform diagram of a PWM (pulse width modulation) signal S1 for periodically generating the first light L1 and the second light L2 according to an embodiment of the invention. Referring to FIG. 1 and FIG. 4, in this embodiment, the first light source is controlled by the PWM signal S1 of the processor 140 in FIG. 1 to generate the first light L1 periodically. In other words, when the PWM signal S1 is in an enabling period (e.g. periods 410, 430, and 450), the first light source generates the first light L1; and when the PWM signal S1 is in a disabling period (e.g. periods 420, 440, and 460), the first light source is closed and does not generate the first light L1. If the processor 140 obtains the third light L3 from the first light L1 in the enabling period of the signal S1 to calculate and obtain a touch signal (here the touch signal is referred to as the estimated touch position) of the stylus 120 or other touching objects, there are several possibilities: the first possibility is that the touch end of the stylus 120 touches the touch surface 160 and enables the second light source to generate the second light; the second possibility is that the touch end of the stylus 120 touches the touch surface 160 but the user does not press the press switch of the stylus 120 to enable the second light source to generate the second light; and the third possibility is that the stylus 120 does not actually touch the touch surface 160.

In order to determine whether the stylus 120 touches the touch surface 160, the processor 140 determines whether the second light L2 is received in the next disabling period of the signal S1. The reason is that: if the first light L1 is continuously generated, and the third light L3 being generated accordingly to the first light L1 and the second light L2 are both infrared lights, the processor 140 is not able to distinguish the third light L3 from the second light L2. In contrast, in the disabling period of the signal S1, the first light L1 is not generated. Therefore, the light that the processor 140 obtains through the optical sensor is the second light L2. The waveform diagram of FIG. 4 is explained below with reference to FIG. 1. If the processor 140 in FIG. 1 obtains the estimated touch position in the enabling period 410 of the signal S1, the processor 140 determines whether the second light L2 is received through the optical sensor in the ray machine module 130 in the next disabling period 420 of the signal S1 (as indicated by the dotted arrow A). Since the processor 140 does not receive the second light L2 (the second light L2 is disabled) in the next disabling period 420 of the signal S1, it indicates that the stylus 120 does not actually touch the touch surface 160, or the user does not press the press switch of the stylus 120 to enable the second light source to generate the second light. Therefore, the processor 140 determines that the estimated touch position is not the position touched by the stylus 120 and discards the estimated touch position.

If the processor 140 in FIG. 1 continues to obtain the estimated touch position in the enabling period 430 of the signal S1, the processor 140 determines whether the second light L2 is received through the optical sensor in the ray machine module 130 in the next disabling period 440 of the signal S1 (as indicated by the dotted arrow A2). Since the processor 140 receives the second light L2 (the second light L2 is enabled) in the next disabling period 440 of the signal S1, it indicates that the stylus 120 touches the touch surface 160. Accordingly, the processor 140 determines that the estimated touch position obtained in the enabling period 430 is the position touched by the stylus 120 and performs a point reporting operation according to the estimated touch position for the optical touch sensing system 110 to achieve the touch function.

In this embodiment, the processor 140 sets a brightness detection threshold value for determining whether the third light L3 can be used for determining the position of the stylus 120. The optical sensor converts a brightness of the light into a grayscale value (in a range of 1-255) after obtaining the light, wherein a maximum brightness of the light is "255", a minimum brightness of the light is "1", and "0" indicates that no light is detected. The brightness detection threshold value is set to "10" in this embodiment, and the processor 140 in the optical touch sensing device 110 receives the third light L3 higher than the brightness detection threshold value "10" to detect the position of the stylus 120. In other words, only the third light L3 having a brightness grayscale value of "10" or more can be used for determining the position of the stylus 120; otherwise, it is discarded. In this embodiment, the brightness of the second light L2 is set to a grayscale value of 2-10, which is smaller than the brightness detection threshold value, so as to reduce power consumption of the stylus 120.

Figure 5:
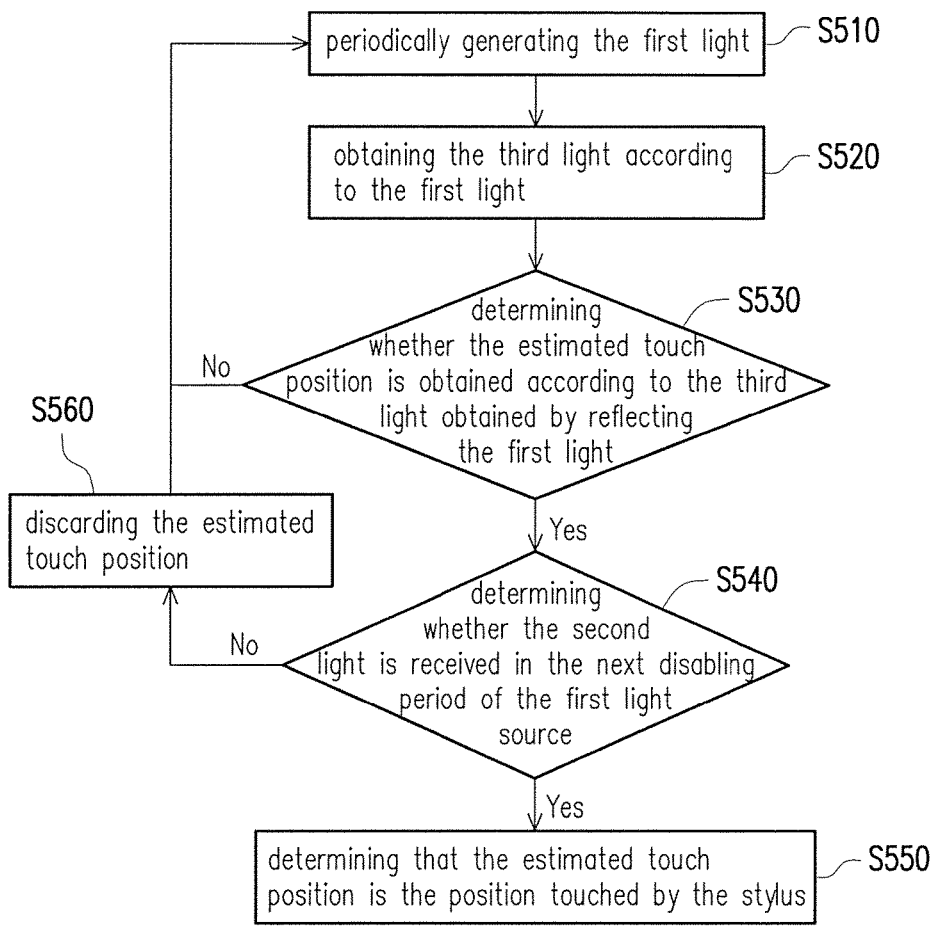
FIG. 5 is a flowchart of the touch detection method for the optical touch sensing device according to an embodiment of the invention.

FIG. 5 is a flowchart of a touch detection method for the optical touch sensing device according to an embodiment of the invention. Referring to FIG. 1 and FIG. 5, the touch detection method is suitable for the optical touch sensing device 110. In Step S510, the processor 140 in the optical touch sensing device 110 controls the first light source in the ray machine module 130 to periodically generate the first light L1. In Step S520, the processor 140 obtains the third light L3 according to the first light L1 through a plurality of optical sensors in the ray machine module 130. In Step S530, the processor 140 determines whether the estimated touch position of the stylus 120 is obtained according to the third light L3 obtained by reflecting the first light L1. If the estimated touch position is not obtained, the processor 140 repeats Steps S510 through S530 to continue determining whether the estimated touch position of the stylus is obtained. When obtaining the estimated touch position, the processor 140 moves from Step S530 to Step S540 to determine whether the second light L2 is received in the next disabling period of the first light. The second light L2 may be generated when the stylus 120 touches the touch surface 160 or when the user presses the switch module of the stylus 120 to enable the second light source to generate the second light L2. If the result of Step S540 is No, the processor 140 moves on to Step S560 to discard the estimated touch position and returns to Step S510 to automatically proceed with the touch detection method.

If the result of Step S540 is Yes, i.e. the processor 140 receives the second light L2 in the next disabling period of the first light, the processor 140 determines that the estimated touch position is the position touched by the stylus 120 and performs the subsequent point reporting operation for the optical touch sensing system 110 to achieve the touch function.

In some embodiments, Step S540 and Step S530 may be performed in reverse order. That is, Step S540 is performed first to determine whether the second light L2 is received in the disabling period of the first light L1. If the result of Step S540 is Yes, it indicates that the position touched by the stylus 120 can be obtained in the next enabling period of the first light. Thus, Step S530 is performed to obtain the touch position. Those who apply this embodiment may adjust the order of Step S530 and Step S540 as required.

Figure 6:
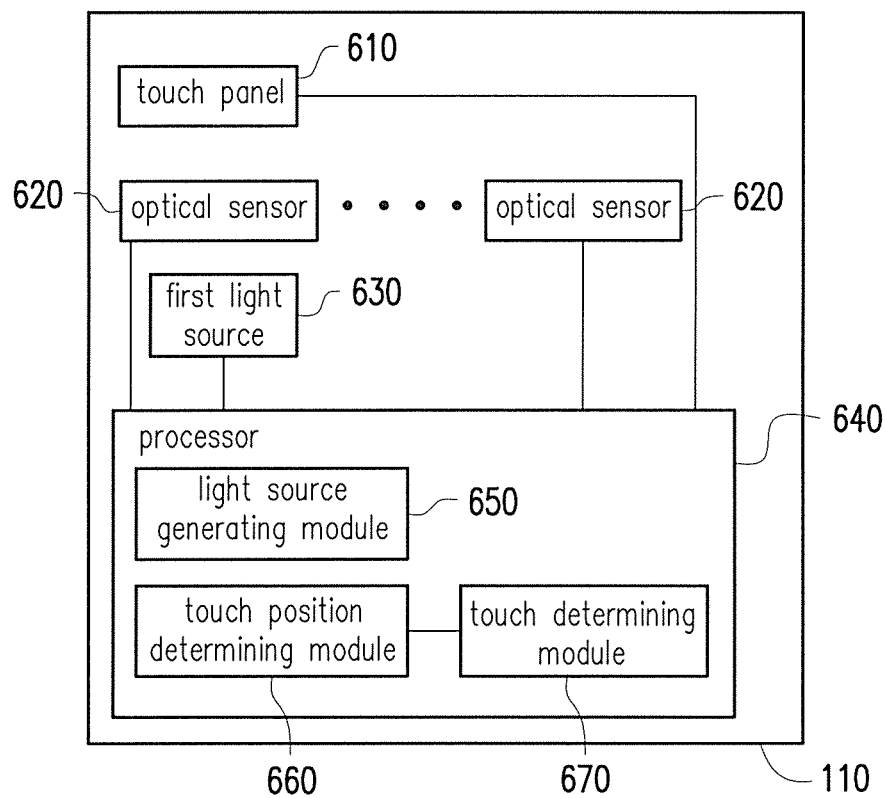
FIG. 6 is a functional block diagram of the optical touch sensing device of FIG. 1.

FIG. 6 is a functional block diagram of the optical touch sensing device 110 of FIG. 1. Referring to FIG. 6, the optical touch sensing device 110 includes a touch panel 610, a plurality of optical sensors 620, a first light source 630, and a processor 640. The touch panel 610, the optical sensors 620, and the first light source 630 are similar to the touch panel 150, the optical sensors in the ray machine modules 130, and the first light source in FIG. 1. The processor 640 may include a plurality of function modules, which may be implemented by software or hardware. The processor 640 includes a light source generating module 650, a touch position determining module 660, and a touch determining module 670. The light source generating module 650 periodically generates a first light through the first light source 630. The touch position determining module 660 determines whether an estimated touch position is obtained according to the first light. The touch determining module 670 is coupled to the touch position determining module 660. After obtaining the estimated touch position, the touch determining module 670 determines whether a second light is received in the next disabling period of the first light. The second light may be generated when the stylus touches a touch surface of the touch panel 610 or when the user presses a switch module of the stylus to enable the second light source to generate the second light L2. If the second light is received, the touch determining module 670 determines that the estimated touch position is the position touched by the stylus. Details for implementing this embodiment have been specified in the previous embodiments.

In conclusion, according to the optical touch sensing system, the optical touch sensing device, and the touch detection method thereof described in the embodiments of the invention, whether the estimated touch position is obtained is determined first according to the first light on the optical touch sensing device. After obtaining the estimated touch position, the optical touch sensing device determines whether the stylus touches the touch panel according to the second light emitted from the stylus in the next disabling period of the first light, wherein the second light may be generated when the stylus touches the touch panel or when the user presses the switch module on the stylus. Accordingly, the optical touch sensing device detects the second light and uses it as the signal to determine whether the stylus touches the touch panel, so as to help determine whether the estimated touch position is actually the position touched by the stylus. In addition, the brightness of the second light may be adjusted to be lower than a threshold value preset by the optical touch sensing device for power saving.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:
1. An optical touch sensing system, comprising:
an optical touch sensing device, comprising:
a touch panel having a touch surface;
a plurality of optical sensors and a first light source, wherein the first light source generates a first light periodically; and
a processor coupled to the optical sensors and the first light source; and
a stylus comprising a switch module and a second light source, wherein the switch module is coupled to the second light source, and when the stylus touches the touch surface, the switch module enables the second light source to generate a second light,
wherein the processor determines an estimated touch position according to the first light received by the optical sensors,
when the estimated touch position is obtained, the processor determines whether the optical sensors receive the second light in a next disabling period of the first light source,
and if the optical sensors receive the second light in the next disabling period of the first light source, the processor determines that the estimated touch position is a position touched by the stylus.

2. The optical touch sensing system according to claim 1, wherein the processor controls the first light source to generate the first light periodically.

3. The optical touch sensing system according to claim 1, wherein the second light source is disposed at a touch end of the stylus and the second light source is a light emitting diode unit.

4. The optical touch sensing system according to claim 1, wherein the first light and the second light have the same wavelength, and a brightness of the second light is lower than a brightness detection threshold value,
wherein the optical sensors receive a third light higher than the brightness detection threshold value to detect the position of the stylus, wherein the third light is the first light reflected by the stylus.

5. The optical touch sensing system according to claim 1, wherein the first light and the second light are infrared lights.

6. The optical touch sensing system according to claim 1, wherein if the processor does not receive the second light in the next disabling period of the first light source, the processor determines that the estimated touch position is not the position touched by the stylus.

7. The optical touch sensing system according to claim 1, wherein the switch module is a pressure switch.

8. The optical touch sensing system according to claim 1, wherein the stylus further comprises:
a reflection area disposed in a pen body portion of the stylus to reflect the first light.

9. A touch detection method for an optical touch sensing device, which comprises a touch surface, the touch detection method comprising:
generating a first light periodically;
determining whether an estimated touch position is obtained according to the first light;
determining whether a second light is received in a next disabling period of a first light source when the estimated touch position is obtained, wherein the second light is generated when a stylus touches the touch surface; and
determining that the estimated touch position is a position touched by the stylus if the second light is received in the next disabling period of the first light source.

10. The touch detection method according to claim 9, further comprising:
determining that the estimated touch position is not the position touched by the stylus when the second light is not received in the next disabling period of the first light source.

11. The touch detection method according to claim 9, wherein the stylus comprises a switch module and a second light source, and the switch module is coupled to the second light source.

12. The touch detection method according to claim 11, wherein the switch module enables the second light source to generate the second light when the stylus touches the touch surface.

13. The touch detection method according to claim 11, wherein the second light source generates the second light when the switch module is pressed.

14. The touch detection method according to claim 9, wherein the second light source is disposed at a touch end of the stylus and the second light source is a light emitting diode unit.

15. The touch detection method according to claim 9, wherein the first light and the second light have the same wavelength, and a brightness of the second light is lower than a brightness detection threshold value,
wherein the optical touch sensing device receives a third light higher than the brightness detection threshold value to detect a position of the stylus, wherein the third light is the first light reflected by the stylus.

16. The touch detection method according to claim 9, wherein the first light and the second light are infrared lights.

17. The touch detection method according to claim 9, wherein the switch module is a pressure switch.

18. An optical touch sensing device, comprising:
a touch panel having a touch surface;
a plurality of optical sensors and a first light source;
a light source generating module controlling the first light source to generate a first light periodically;
a touch position determining module determining whether an estimated touch position is obtained according to the first light; and
a touch determining module coupled to the touch position determining module, wherein when the estimated touch position is obtained, the touch determining module determines whether a second light is received in a next disabling period of the first light source, wherein the second light is generated when a stylus touches the touch surface,
and if the second light is received in the next disabling period of the first light source, the touch determining module determines that the estimated touch position is a position touched by the stylus.

19. An optical touch sensing system, comprising:
an optical touch sensing device, comprising:
a touch panel having a touch surface;
a plurality of optical sensors and a first light source, wherein the first light source generates a first light periodically; and
a processor coupled to the optical sensors and the first light source; and
a stylus comprising a switch module and a second light source, wherein when the switch module is pressed, the second light source generates a second light,
wherein the processor determines an estimated touch position according to the first light received by the optical sensors,
when the estimated touch position is obtained, the processor determines whether the second light is received in a next disabling period of the first light source, wherein the second light is generated when a user presses the switch module to enable the second light source,
and if the second light is received in the next disabling period of the first light source, the processor determines that the estimated touch position is a position touched by the stylus.

20. The optical touch sensing system according to claim 19, wherein the switch module of the stylus is a press switch.

21. A touch detection method for an optical touch sensing device, which comprises a touch surface, the touch detection method comprising:
generating a first light periodically;
determining whether an estimated touch position is obtained according to the first light;
determining whether a second light is received in a next disabling period of a first light source when the estimated touch position is obtained, wherein the second light is generated when a switch module of a stylus is pressed; and determining that the estimated touch position is a position touched by the stylus if the second light is received in the next disabling period of the first light source.

22. An optical touch sensing device, comprising:

a touch panel having a touch surface;

a plurality of optical sensors and a first light source;

a light source generating module controlling the first light source to generate a first light periodically;

a touch position determining module determining whether an estimated touch position is obtained according to the first light; and a touch determining module coupled to the touch position determining module, wherein when the estimated touch position is obtained, the touch determining module determines whether a second light is received in a next disabling period of the first light source, wherein the second light is generated when a switch module of a stylus is pressed, and if the second light is received in the next disabling period of the first light source, the touch determining module determines that the estimated touch position is a position touched by the stylus.

\* \* \* \* \*